(12) United States Patent
Laine et al.

(10) Patent No.: US 11,691,609 B2
(45) Date of Patent: Jul. 4, 2023

(54) REDUNDANT MOTION CONTROL FOR A VEHICLE WITH A REDUNDANT BRAKING ARRANGEMENT

(71) Applicant: Volvo Truck Corporation, Gothenburg (SE)

(72) Inventors: Leo Laine, Härryda (SE); Lionel Farres, Heyrieux (FR); Christian Oscarsson, Stenungsund (SE); Leon Henderson, Gothenburg (SE); Johanna Majqvist, Gothenburg (SE); Jose Vilca, Gothenburg (SE); Kristoffer Tagesson, Gothenburg (SE); Karthik Ramanan Vaidyanathan, Hisings Backa (SE); Nicolas Soulier, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 308 days.

(21) Appl. No.: 17/052,329

(22) PCT Filed: May 3, 2018

(86) PCT No.: PCT/EP2018/061412
§ 371 (c)(1),
(2) Date: Nov. 2, 2020

(87) PCT Pub. No.: WO2019/210964
PCT Pub. Date: Nov. 7, 2019

(65) Prior Publication Data
US 2021/0078556 A1 Mar. 18, 2021

(51) Int. Cl.
*B60T 13/68* (2006.01)
*B60T 8/32* (2006.01)
(Continued)

(52) U.S. Cl.
CPC .......... *B60T 13/683* (2013.01); *B60T 8/321* (2013.01); *B60T 8/88* (2013.01); *B60T 15/027* (2013.01);
(Continued)

(58) Field of Classification Search
CPC ...... B60T 13/683; B60T 17/221; B60T 8/321; B60T 15/027; B60T 7/085;
(Continued)

(56) References Cited

U.S. PATENT DOCUMENTS

| 5,862,502 A | 1/1999 | Giers |
| 2005/0165531 A1* | 7/2005 | Nilsson ................. B60T 8/1708 701/70 |

(Continued)

FOREIGN PATENT DOCUMENTS

| DE | 4341082 A1 | 6/1995 |
| WO | 2004/098967 A2 | 11/2004 |

(Continued)

OTHER PUBLICATIONS

British Patent No. GB 2583533 to Fry et al dated Nov. 4, 2020.*
(Continued)

*Primary Examiner* — Pamela Rodriguez
(74) *Attorney, Agent, or Firm* — Withrow & Terranova, PLLC

(57) ABSTRACT

A control arrangement for a vehicle motion system including a braking function, comprising motion actuators with one or more brake actuators pertaining to the braking function, a first vehicle motion management controller (VMM1) and a second vehicle motion management controller (VMM2), forming a redundant assembly to control the braking function, wherein, in riding conditions, the first vehicle motion management controller controls the brake actuators with a current nominal expected braking performance, while the (Continued)

second vehicle motion management controller (VMM2) is in a waiting-to-operate mode, the control arrangement comprising a hot swap functionality in which the second vehicle motion management controller (VMM2) is configured to take over control of the brake actuators from the first vehicle motion management controller, with the current nominal expected braking performance, in a short time period (SWT) less than one second, preferably less than 0.5 second, preferably less than 0.3 second, and associated control method.

14 Claims, 8 Drawing Sheets

(51) Int. Cl.
  *B60T 8/88* (2006.01)
  *B60T 15/02* (2006.01)
  *B60T 17/22* (2006.01)
  *B60T 7/04* (2006.01)
  *B60T 7/08* (2006.01)
  *B60T 7/22* (2006.01)
(52) U.S. Cl.
  CPC .............. *B60T 17/221* (2013.01); *B60T 7/042* (2013.01); *B60T 7/085* (2013.01); *B60T 7/22* (2013.01); *B60T 2201/022* (2013.01); *B60T 2240/00* (2013.01); *B60T 2270/402* (2013.01); *B60T 2270/413* (2013.01)

(58) Field of Classification Search
  CPC ......... B60T 2270/402; B60T 2270/413; B60T 2240/00; B60T 2201/002; B60T 8/88; B60T 7/042; B60T 7/22
  See application file for complete search history.

(56) References Cited

U.S. PATENT DOCUMENTS

| | | | |
|---|---|---|---|
| 2007/0170774 | A1 | 7/2007 | Gerum et al. |
| 2016/0325719 | A1 | 11/2016 | Linhoff et al. |
| 2017/0274884 | A1 | 9/2017 | Besier et al. |
| 2021/0031741 | A1* | 2/2021 | Alford .................. B60T 13/662 |
| 2021/0237703 | A1* | 8/2021 | Henderson ............ B60T 13/683 |
| 2022/0315020 | A1* | 10/2022 | Tag ..................... B60W 50/023 |

FOREIGN PATENT DOCUMENTS

| | | |
|---|---|---|
| WO | 2017036569 A1 | 3/2017 |
| WO | 2017221836 A1 | 12/2017 |

OTHER PUBLICATIONS

Reasons for Rejection for Japanese Patent Application No. 2020561684, dated Mar. 23, 2022, 13 pages.
International Search Report and Written Opinion for PCT/EP2018/061412, dated Mar. 27, 2019, 10 pages.
Request for the Submission of an Opinion for Korean Patent Application No. 1020207034591, dated Oct. 19, 2022, 14 pages.

* cited by examiner

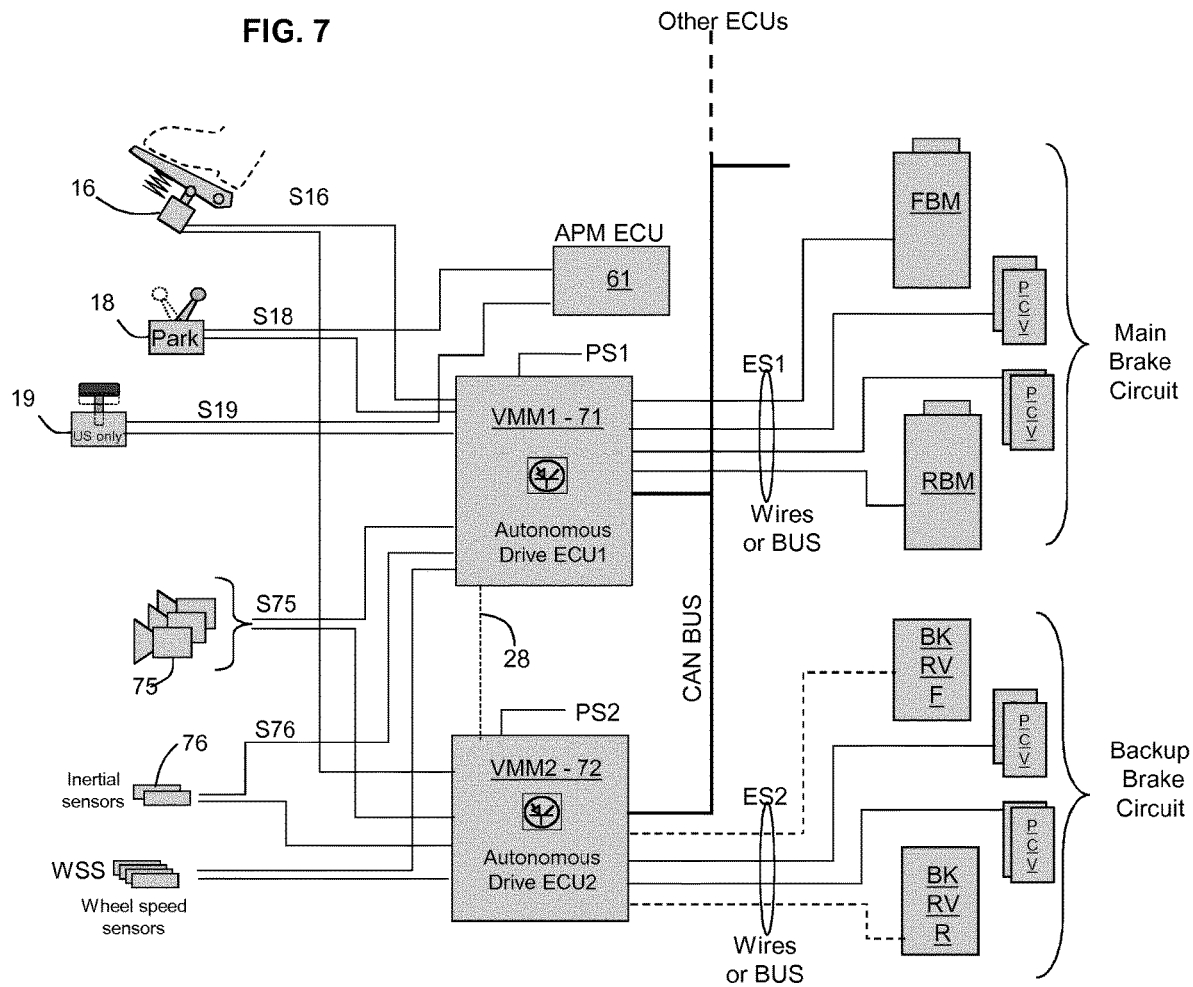
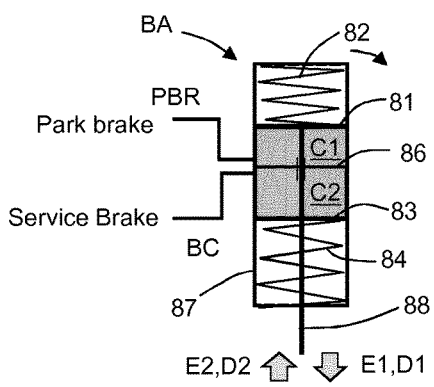

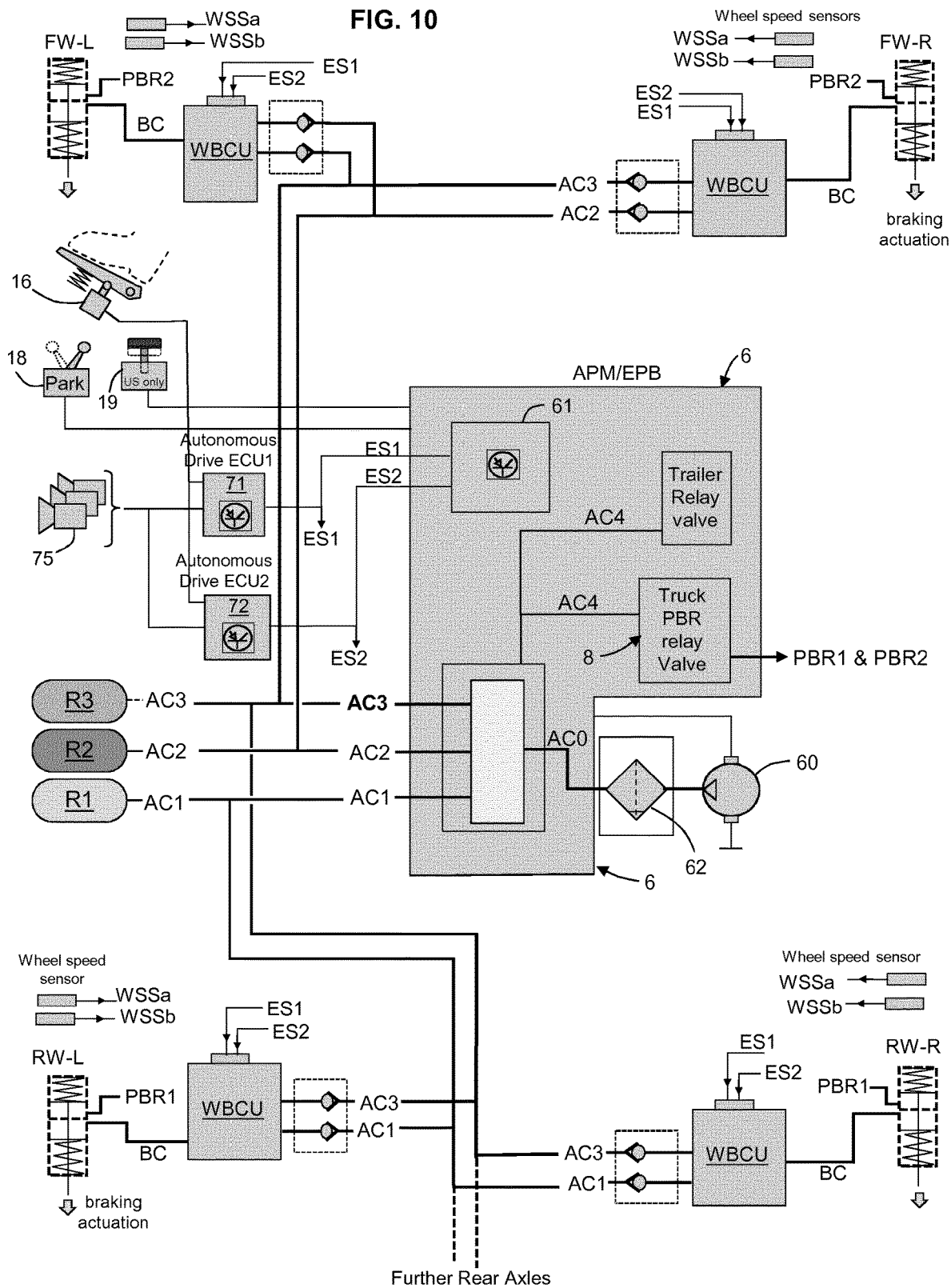

REDUNDANT MOTION CONTROL FOR A VEHICLE WITH A REDUNDANT BRAKING ARRANGEMENT

This application is a 35 USC 371 national phase filing of International Application No. PCT/EP2018/061412, filed May 3, 2018, the disclosure of which is incorporated herein by reference in its entirety.

FIELD OF THE INVENTION

This invention relates to vehicle motion control, particularly in view of the automated vehicles and/or vehicles having basic or elaborate autonomous drive features, where redundancy is required to cope with a situation where one control device may become unavailable. In particular, automated vehicles like trucks or medium duty or heavy duty vehicles require an electronically controlled brake system which shall exhibit some redundancy.

BACKGROUND OF THE DISCLOSURE

In the field of automotive vehicles, reliable trajectory control is among the prominent safety features required for ensuring smooth and secure traffic on roads. More particularly, steering and braking function are of utmost importance, let alone drivetrain torque control.

Automated vehicles comprise one or more vehicle motion management controller(s) which can substitute for actions previously perform by the driver(s). Redundancy criteria usually prompt to duplicate the vehicle motion management controllers, to comply with Safety and Integrity levels (SILs) required for high level autonomous drive features.

Automated vehicles require a reliable and powerful braking function. The braking function relies, in particular for trucks, and more generally for heavy duty vehicles, on an electro-pneumatic system using air under pressure as working fluid.

It has been made compulsory for long to provide two independent pneumatic circuits, as a redundant arrangement in order to keep a braking capability in case one circuit undergoes a failure. Later, solutions using electric control on top of baseline pneumatic system were introduced to speed up pressure changes at axles, so the effective control at brake actuators can reflect driver controls in a more real time fashion.

More recently, a trend to go towards brake-by-wire solutions has lead the trucks designers to simplify the foot pedal brake unit by removing all the pneumatic components from the foot pedal unit, as taught in EP2794368. However, reliability and tolerance to failure(s) must still be ensured, especially in the area of electrical controls and pneumatic controls.

Besides pneumatic systems, it is also considered in the scope of the present disclosure electromechanical brakes and hydraulic brakes.

Now, with the outlook of autonomous vehicles and vehicle automation, the inventors have endeavored to find new solutions for providing redundant electro-pneumatic braking systems, and more generally redundant control of the vehicle motion.

SUMMARY OF THE DISCLOSURE

According to one aspect of the present invention, it is disclosed a control arrangement for a vehicle motion system including a braking function, comprising:

motion actuators with at least one or more brake actuators pertaining to the braking function, at least a first vehicle motion management controller (VMM1) and a second vehicle motion management controller (VMM2), forming a redundant assembly to control the braking function, wherein, in riding conditions, the first vehicle motion management controller is controlling the brake actuators with a current nominal expected braking performance, while the second vehicle motion management controller (VMM2) is in a waiting-to-operate mode, without substantial influence on the braking performance, the control arrangement comprising a hot swap functionality in which the second vehicle motion management controller (VMM2) is configured to take over control of the brake actuators from the first vehicle motion management controller, with the current nominal expected braking performance, in a time period (SWT) less than one second, preferably less than 0.5 second, more preferably less than 0.3 second.

Thanks to this arrangement, a hot takeover is proposed, since the time to switch from VMM1 to VMM2 and reach 100% full envelope performance is very small, and this allows to control seamlessly vehicle motion, including under any braking conditions and even braking under emergency conditions in case of collision avoidance function (object or obstacle detected on the road) or extreme driving and handling conditions.

Advantageously, the waiting-to-operate mode is a nearly ready-to-be-used mode, with setpoint level a somewhat lower than the setpoint level used by the on-line control of the brake actuators.

Whenever the first vehicle motion management controller happens to have a problem (or its associated actuators or its associated essential sensors), the second vehicle motion management controller (VMM2) can take over shortly, together with its own associated actuators or its own associated sensors.

In the context of the present document the term "vehicle" encompasses not only motorized vehicles but also trailers configured to be attached to a towing unit. Both the towing unit and the trailer can comprise a control arrangement as promoted here.

It is noted that a similar process for steering function can be carried out.

It should be understood by the clause "non nominal condition at VMM1" either a problem affecting the first controller VMM1 itself or its power supply, or a substantial problem affecting the brake actuators controlled by VMM1, or either a problem affecting a sensor essential to carry out proper control.

It should be noted that some brake actuators can be formed by one or more wheelmotor (traction motor integrated in the wheel area) in charge of both propulsion and braking.

In various embodiments of the invention, one may possibly have recourse in addition to one and/or other of the following arrangements, taken alone or in combination.

According to one aspect, the braking actuators operate with compressed air. This is a particularly suitable and relevant solution for trucks, buses or medium duty or heavy duty vehicles. This is also a particularly suitable and relevant solution for trailers.

According to another aspect, the braking actuators are of the electromechanical brakes type. This is an alternative to pneumatic solution, with for example an electrical motor and cam-base or wedge-based movement for braking actuation, the cam-base or wedge-based movement being precharged in the waiting-to-operate mode.

According to one aspect, the braking actuators are of the hydraulic brakes type. This is an alternative to pneumatic solution, with oil instead or air as working fluid.

According to one aspect, there may be provided a main braking pneumatic circuit (MBC) controlled by the first vehicle motion management controller (VMM1) in charge of the current nominal expected braking performance, and a backup braking pneumatic circuit (BKC) controlled by the second vehicle motion management controller (VMM2), wherein the backup braking pneumatic circuit (BKC) is pre-charged in the waiting-to-operate mode, with a waiting-to-operate pressure which is less than the pressure applied in the main braking pneumatic circuit (MBC). Advantageously, the waiting-to-operate mode is such that the backup braking pneumatic circuit delivers a braking pressure somewhat lower than the braking pressure provided by the main braking pneumatic circuit (MBC) and used by the on-line control of the brake actuators.

According to one aspect, the system may comprise one or more brake control device at each vehicle axle or at each braked wheel, configured to deliver a controlled pressure (PREF(t)) to one or more associated brake actuator(s). Several possible configurations are envisioned to provide a controlled pressure at each brake actuator from the main braking pneumatic circuit (MBC) and/or from the backup braking pneumatic circuit (BKC).

According to one aspect, the system may comprise one or more local braking arrangement, each of such braking arrangement comprising:
 a brake actuator (BA), with a service brake chamber (C2),
 a double check valve (2FL, 2FR,2RL,2RR) with:
  an outlet (26) coupled to the service brake chamber (C2) of the brake actuator (BA),
  a first inlet (21) coupled to the main braking pneumatic circuit (MBC),
  a second inlet (22) coupled to the backup braking pneumatic circuit (BKC),
wherein the pressure (PBK) in the backup braking pneumatic circuit (BKC), with regard to the pressure (PREF) in the main braking pneumatic circuit (MBC), is caused to lie within a waiting-to-operate range, the waiting-to-operate range being defined by the condition: 0.5 PREF<PBK<0.99 PREF. Thereby the time to reach 100% PREF is backup braking pneumatic circuit (BKC) is short, much shorter if the braking pneumatic circuit was activated from null pressure.

According to one aspect, it is considered that the waiting-to-operate range is such that: 0.85 PREF<PBK<0.95 PREF. Thereby the time to reach 100% PREF is backup braking pneumatic circuit (BKC) is even shorter. Practically, the time to switch from VMM1 to VMM2 and reach 100% full envelope performance can be shorter than 0.5 second, even shorter than 0.3 second, even shorter than 0.2 second. This allows to seamlessly cope with a vehicle motion management transition, encompassing any braking condition and even braking under extreme emergency braking.

According to one aspect, there is provided a pressure control valve (PCV) which performs an anti-locking function (ABS function), the pressure control valve being interposed between the double check valve and the service brake chamber (C2) of the brake actuator (BA). Thereby the ABS function is provided both under nominal operation when VMM1 is in control and under backup condition when VMM2 has taken over control. In this configuration, the pressure control valve can be controlled in parallel by VMM1 and VMM2.

According to an alternative aspect, there is provided a pressure control valve (PCV) which performs an anti-locking function (ABS function), the pressure control valve being arranged upstream the double check valve on the backup braking pneumatic circuit (BKC). Thereby the ABS function is provided even under backup condition when VMM2 has taken over control.

According to one aspect, there is provided a cross communication link (28) between first and second vehicle motion management controller (VMM1,VMM2). Thereby, the first and second vehicle motion management controller can monitor each other, through mutual exchanges of 'alive & healthy' signals; and therefore a failure can be detected whenever one controller becomes mute.

According to one aspect, in the waiting-to-operate mode, the second vehicle motion management controller (VMM2) receives, in a real-time fashion, current setpoints from the first vehicle motion management controller (VMM1). Thereby the second vehicle motion management controller (VMM2) can follow in real time on-line setpoints, such that the second vehicle motion management controller (VMM2) can compute therefrom a waiting-to-operate pressure setpoint.

According to one aspect, the backup braking pneumatic circuit (BKC) may be formed by the parking brake circuit, in this case the pre-charge is a pressure lower than the normal parking brake pressure (PBref) under normal driving conditions. Therefore, few additional components are required to make available the desired backup braking pneumatic circuit, forming thereby a cost effective solution. This is particularly relevant when parking brake function is also featuring anti-locking function by itself. However, it is to be noted that the pressure logic here is inverse; a pressure of 8 to 9 bars is applied to release parking brake in chamber C1 of brake actuator (BA), and conversely pressure should be decreased to apply a brake force. Therefore, instead of a pre-charge, the pressure applied to the parking brake in chamber C1 is de-charged to a threshold in the range [5-6 bars]. Therefore, a further decrease in this pressure generated promptly a braking actuation.

According to a further aspect of the present disclosure, it is proposed a method to control a vehicle motion system including a braking function, the vehicle motion system comprising motion actuators with at least one or more brake actuators pertaining to the braking function, at least a first vehicle motion management controller (VMM1) and a second vehicle motion management controller (VMM2) forming a redundant assembly to control the braking function, the method comprising:
/a/ in riding conditions, the first vehicle motion management controller controls the brake actuators with a current nominal expected braking performance, while the second vehicle motion management controller (VMM2) is in a waiting-to-operate mode, without substantial influence on the braking performance,
/b/ upon non nominal condition at VMM1, i.e. part or all features of VMM1 becomes unavailable, the second vehicle motion management controller (VMM2) is configured to take over control of the brake actuators from the first vehicle motion management controller, with the current nominal expected braking performance, wherein the control takeover is achieved within a time period (SWT) less than one second, preferably less than 0.5 second, more preferably less than 0.3 second.

Thanks to this method, a fast hot takeover is achieved; the time to switch from VMM1 to VMM2 and reach 100% full envelope performance is very small, and this allows a seamlessly cope transition from vehicle motion management VMM1 to VMM2, including under any braking condition and even braking under extreme driving and handling conditions.

Advantageously, the waiting-to-operate mode is a nearly ready-to-be-used mode, with setpoint level a somewhat lower than the setpoint level used by the on-line control of the brake actuators.

Whenever the first vehicle motion management controller happens to have a problem (or its associated actuators or its associated essential sensors), the second vehicle motion management controller (VMM2) can take over shortly, together with its own associated actuators or its own associated sensors.

It should be understood by the clause "non nominal condition at VMM1" either a problem affecting the first controller VMM1 itself or its power supply, or a substantial problem affecting the brake actuators controlled by VMM1, or either a problem affecting a sensor essential to carry out proper control.

It is noted that a similar process for steering function can be carried out.

According to one aspect, the method may include:
in the waiting-to-operate mode, the second vehicle motion management controller (VMM2) receives, in a real-time fashion, current setpoints from the first vehicle motion management controller (VMM1). Thereby the second vehicle motion management controller (VMM2) can follow in real time on-line setpoints, such that the second vehicle motion management controller (VMM2) can compute therefrom a waiting-to-operate pressure setpoint.

According to one aspect, the second vehicle motion management controller (VMM2) calculates on its own, in a real-time fashion, current setpoints from the first vehicle motion management controller (VMM1) setpoints received from the first vehicle motion management controller (VMM1).

According to one aspect, there is provided a cross communication link (28) between first and second local vehicle motion management controllers (VMM1,VMM2), which exchange with one another 'alive & healthy' signals. Thereby, the first and second vehicle motion management controllers can monitor each other, through mutual exchanges of 'alive & healthy' signals; and therefore a failure can be detected whenever one controller becomes mute.

According to a further aspect, the present disclosure is also directed to a vehicle comprising a control arrangement and/or a system as described above.

BRIEF DESCRIPTION OF THE DRAWINGS

Other features and advantages of the invention appear from the following detailed description of two of its embodiments, given by way of non-limiting example, and with reference to the accompanying drawings, in which:

FIG. 7 illustrates an electrical and functional diagram,

FIG. 8 illustrates a brake pneumatic actuator,

FIG. 10 is similar to FIG. 3 and shows a variant embodiment.

DETAILED DESCRIPTION OF THE DISCLOSURE

In the figures, the same references denote identical or similar elements. Unless stated otherwise, the pneumatic lines are shown thicker than the electrical lines.

Overview of the System

Figure 1:
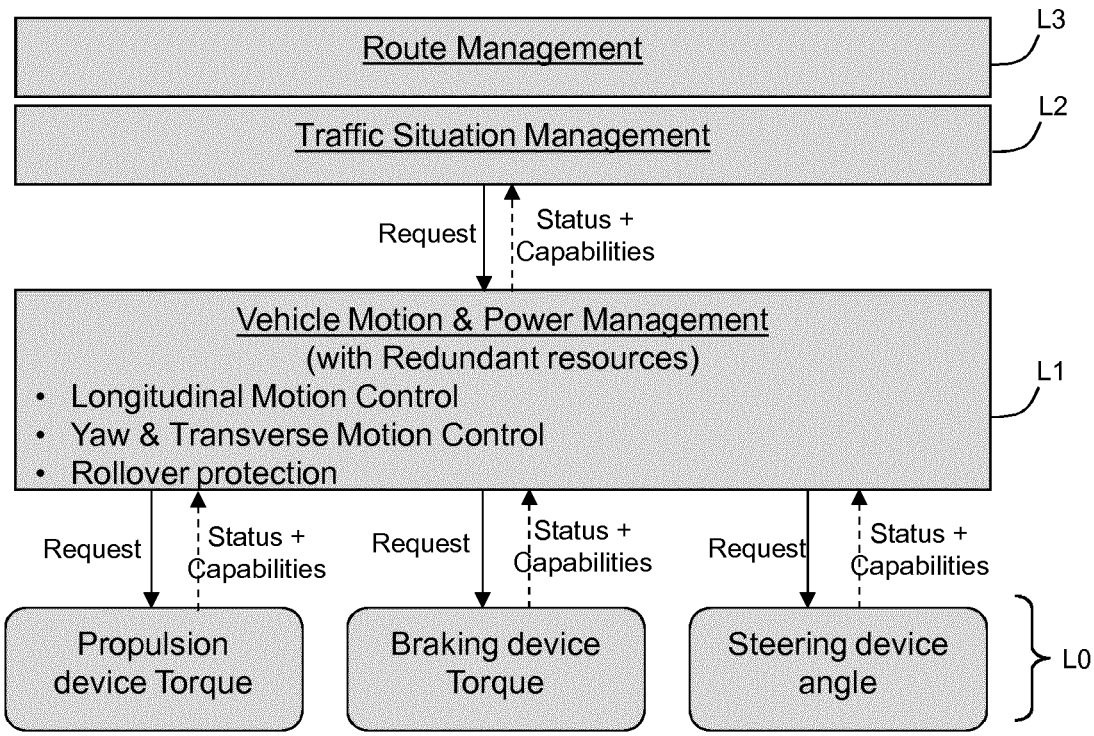
FIG. 1 illustrates a general layout of an autonomous drive system of a vehicle.

FIG. 1 illustrates a general layout of an autonomous drive system of a vehicle. The proposed configuration is valid for any kind of medium-duty or heavy-duty vehicles including buses and coaches. However, light vehicles and off-road vehicles can also be encompassed in the present disclosure. Trailers are also considered in the scope of the present disclosure.

The truck considered here can be the traction unit in a tractor/trailer configuration or a utility 'carrier' truck.

At least one front axle is a steering axle, without excluding other axle(s) having a steering function including a rear axle.

The truck considered here can have one or more level(s) of autonomous drive functionalities, entailing reinforced needs for redundancy in braking systems.

The autonomous drive functionalities may be decomposed in several layers. At base layer L0 are provided trajectory control entities, like propulsion torque function, braking function and steering function.

The drivetrain torque function comprises the assembly: (engine+gearbox+transmission). The torque is controlled by a throttle device, which is in the present case a motorized throttle device, which can be controlled conventionally from a gas pedal if a driver is present or by one or more electronic control units.

The braking function will be explained in more detail later. The drivetrain torque function and the braking function contribute to the longitudinal motion control of the vehicle.

We note here that there may be provided one or more wheelmotor (i.e. a traction motor integrated at the wheel area) in charge of both propulsion and braking.

The steering function involves one or more actuator(s) configured to actively control the steering angle of at least on front axle.

The steering function is the main contributor to the yaw and transverse motion control of the vehicle. However, selective braking can also contribute, as far as ESP function is concerned, to the yaw and transverse motion control of the vehicle.

The steering function together with the braking function also contributes to the rollover protection function.

Layer L1 is called "Vehicle Motion & Power Management" and comprises one or more electronic control units or equivalent computing resources to manage the following functions: Longitudinal Motion Control, Yaw & Transverse Motion Control and Rollover protection.

The one or more electronic control units build and deliver requests toward layer L0. Each function (drivetrain torque, braking, steering) returns a status and capabilities of their actuators. At layer L1, there may be provided inertial sensors 76 for delivering real time signals about the actual behavior of the vehicle.

Layer L2 is called "Traffic Situation Management" and comprises one or more electronic control units or equivalent computing resources to make decisions about vehicle short term trajectory. At layer L2, there may be provided precise geolocation means such GPS, Glonass™, Galileo™ and likewise solutions, and/or relative location means with regard to road lane (beacons or the like). At layer L2, there may be provided cameras for delivering a flow of images about the vehicle immediate environment. Decisions about vehicle short term trajectory are transmitted to the lower layer L1 as requests. Lower layer L1 returns to layer L2 the actual behavior of the vehicle, and high level status of the vehicle motion systems.

Layer L3 is called "Route Management" and comprises one or more electronic control units or equivalent computing resources to make decisions about vehicle medium/long term trajectory. Layer L3 may include navigation calculation, traffic congestion avoidance, etc.

Figure 2:
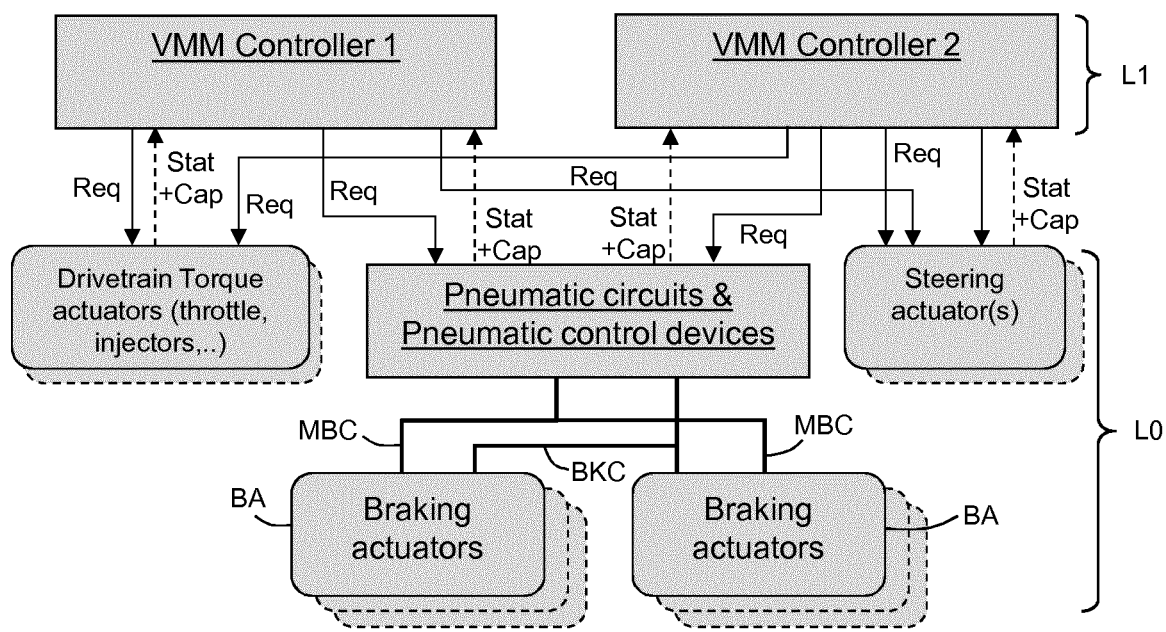
FIG. 2 illustrates a diagrammatical circuit layout of a redundant autonomous drive system of a vehicle.

FIG. 2 illustrates a diagrammatical circuit layout of a redundant autonomous drive system involved mainly in layers L0, L1 as discussed above. Here we consider the case of a pneumatic braking system, while other technological solutions are also considered as already mentioned above.

In the overall system, there are provided here two vehicle motion electronic control units, VMM1, VMM2, likewise called autonomous drive ECUs VMM1, VMM2 or vehicle motion controllers.

Each of the two vehicle motion control units sends request(s) to the entities at layer L0, and receives in return status and capabilities about the various actuators.

Focusing now more on the braking function, each of the two vehicle motion control units sends request to various pneumatic circuits & pneumatic control devices, that will be detailed later. In the illustrated example here, there is a provided a main braking pneumatic circuit MBC (first braking channel) and a backup braking pneumatic circuit BKC (second braking channel).

The present disclosure also encompasses the cases in which there are provided two redundant braking assembly, with two channels, e.g. channel A and channel B, completely symmetrical (the backup is a full duplicate of the 'main' one) and the roles of VMM1 and VMM2 can be exchanged.

The pneumatic brake system mentioned above constitutes the main service brake system of the vehicle which is used to slow down and to stop the vehicle during normal operation, whatever the speed of the vehicle. Besides, the park brake system is used mainly to maintain the vehicle stopped when it is not in use. The park brake system can be least partly combined with the service brake system, nevertheless, a park brake system can be independent of the service brake system, it can for example comprise a system for blocking the vehicle transmission.

Heavy-duty vehicles, such as trucks and buses, are also often equipped with a deceleration system (likewise called 'retarder'), which is only capable of slowing down a vehicle, but often not capable of effectively stopping the vehicle completely within a reasonable distance. Such deceleration systems, such as hydro-dynamic brakes or electro-dynamic brakes, are mostly efficient when the vehicle is riding above a certain speed. Such deceleration systems are by essence different from the pneumatic brake system described above.

Figure 3:
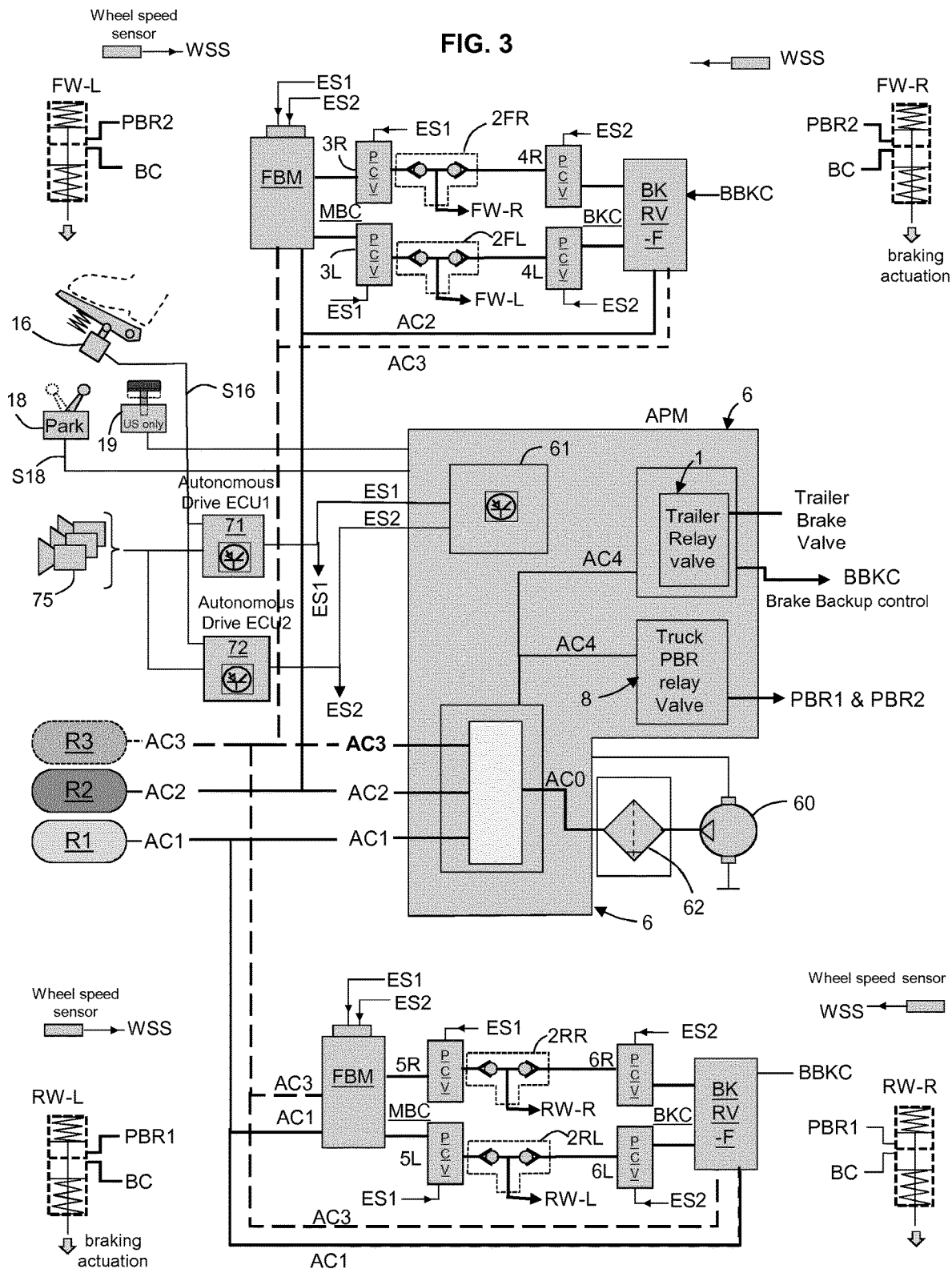
FIG. 3 illustrates a diagrammatical circuit layout of an electro-pneumatic braking system for a truck according to the invention.

FIG. 3 shows a diagrammatical circuit layout of an electro-pneumatic braking system for a truck.

For the sake of clarity we have represented the same brake actuator for all the wheels, but of course, there may be variations and difference according to the location of the wheel (front, rear, trailer etc. . . . )

As known per se, there are provided brakes actuators (RW-L, RW-R, FW-L, FW-R) that can be combined service brake and park brake actuators.

As shown on FIG. 8 each brake actuator (generically referred to as BA) includes a first piston 81 loaded by a first spring 82 which exerts a first effort E1 in a first direction D1. Brake actuator BA also includes a second piston 83 loaded by a second spring 84 which exerts a second effort E2 in a direction D2 opposite to direction D1. Piston 83 is rigid with an output rod 88 of brake actuator which drives an associated brake mechanism (brake pads, disc, etc. not shown). A fixed wall 86 is mounted within a housing 87 of brake actuator. Wall 86 defines, respectively with pistons 81 and 83, two chambers C1, C2 of a variable volume. The rod 88 is coupled to the piston 83, crosses the wall 86 in an air tight manner and is coupled to the piston 81. Springs 82 and 84 are chosen so that effort E1 is larger than effort E2. Thus, in absence of air pressure within chambers C1 and C2, effort E1 pushes piston 81 in direction D1. This effort is transmitted by piston 83 to rod 88 to actuate the associated brake mechanism in a first direction. Under such circumstances, brake mechanism engages the brake disk(s) or drum(s) of the associated rear left wheel or wheels. This corresponds to a park brake actuation for truck. In other words, when no air under pressure is provided to brake actuator BA, the park brake of truck is actuated. Instead of pistons, flexible membranes or diaphragms can be used.

When air under pressure is provided to chamber C1 supplied by input PBR (Parking Brake Release, respectively PBR2 or PBR1 for front and rear), the air pressure within this chamber pushes piston 81 against the action of spring 82 and spring 84 pushes piston 83 in direction D2. This corresponds to the release of the park brake of truck by air pressure.

When the park brake has been released and if air under pressure is provided to chamber C2 supplied by input BC (Brake control), the air pressure within chamber C2 pushes piston 83 in direction D1 which progressively actuates brake mechanism in order to brake the corresponding wheel or wheels. The mechanical effort delivered by the actuator to the brake mechanism increases with the air pressure delivered to chamber C2. This corresponds to the actuation of the service brake of truck. The service brake actuator is the device which transforms the air pressure into a mechanical force.

A trailer attached to the truck can also comprise similar wheel brake control device.

There may be provided more than 4 brake actuators, in case there are two front axles, and/or two or more rear axles. The number of brake actuators can amount to 2, 4, 6, 8, or more. It is worth noting that some brake actuators can be deprived of the parking brake function. The number of brake actuators can be twice the number of axles.

In the illustrated example, each axle or group of axles is equipped with a brake module, e.g. in the illustrated example a front axle brake module FBM and one (or more) rear axle brake module RBM. Additionally, there is provided a backup relay valve BKRV-F associated with the front axle brake module FBM. Additionally, there is provided one (or more) backup relay valve(s) BKRV-R associated with each rear axle brake module RBM.

However, in a different configuration shown at FIG. 10, there may be provided one decentralized brake module WBCU with integrated backup function per wheel or one such decentralized brake module WBCU with integrated backup function per twin wheels.

The front axle brake module FBM provides generally pneumatic control pressure to the left and right front pneumatic brake actuators (FW-L, FW-R), through pressure control valves (PCV in short). Each pressure control valve PCV performs anti-locking function (ABS function). For example, each pressure control valve PCV has a first valve in a series arrangement that can block the passage or air down to the brake chamber, and a second valve that can take out air from the brake chamber circuit and release it to the atmosphere. These valves are controlled in accordance with the real time analysis of the speed of each wheel.

More precisely regarding the layout, a pressure control valve 3R is arranged downstream the front axle brake module FBM for the right wheel channel; a pressure control valve 3L is arranged downstream the front axle brake module FBM for the left wheel channel.

Similarly, a pressure control valve 4R is arranged downstream backup relay valve BKRV-R for the right wheel channel; a pressure control valve 4L is arranged downstream backup relay valve BKRV-L for the left wheel channel.

Advantageously according to the present disclosure, there are provided double check valves (2FL, 2FR, 2RL, 2RR). Such double check valve can also be known as 'Select High', since its output is the higher pressure prevailing at its two inputs.

A double check valve 2FR is arranged downstream the pressure control valves on the right wheel channel, the output of the double check valve 2FR is coupled to the to the chamber C2 of the corresponding brake actuator FW-R. A double check valve 2FL is arranged downstream the pressure control valves on the left wheel channel, the output of the double check valve 2FL is coupled to the to the chamber C2 of the corresponding brake actuator FW-L.

The rear axle brake module RBM provides generally pneumatic control pressure to the left and right rear pneumatic brake actuators (RW-L,RW-R) with an arrangement similar to one of the front axle.

Pressure control valves 4R,4L are arranged downstream the rear axle brake module RBM, respectively for the right and left wheel channels. Pressure control valves 5R,5L are arranged downstream the backup relay valve BKRV-R, respectively for the right and left wheel channels. A double check valve 2RR is arranged downstream the pressure control valves on the right wheel channel, the output of the double check valve 2RR is coupled to the to the chamber C2 of the corresponding brake actuator RW-R. A double check valve 2RL is arranged downstream the pressure control valves on the left wheel channel, the output of the double check valve 2RL is coupled to the to the chamber C2 of the corresponding brake actuator RW-L.

Thanks to this arrangement, two independent pneumatic circuits are provided: a main braking pneumatic circuit MBC and a backup braking pneumatic circuit BKC, the latter can otherwise be called 'secondary' or 'auxiliary' braking pneumatic circuit.

Figure 5A:
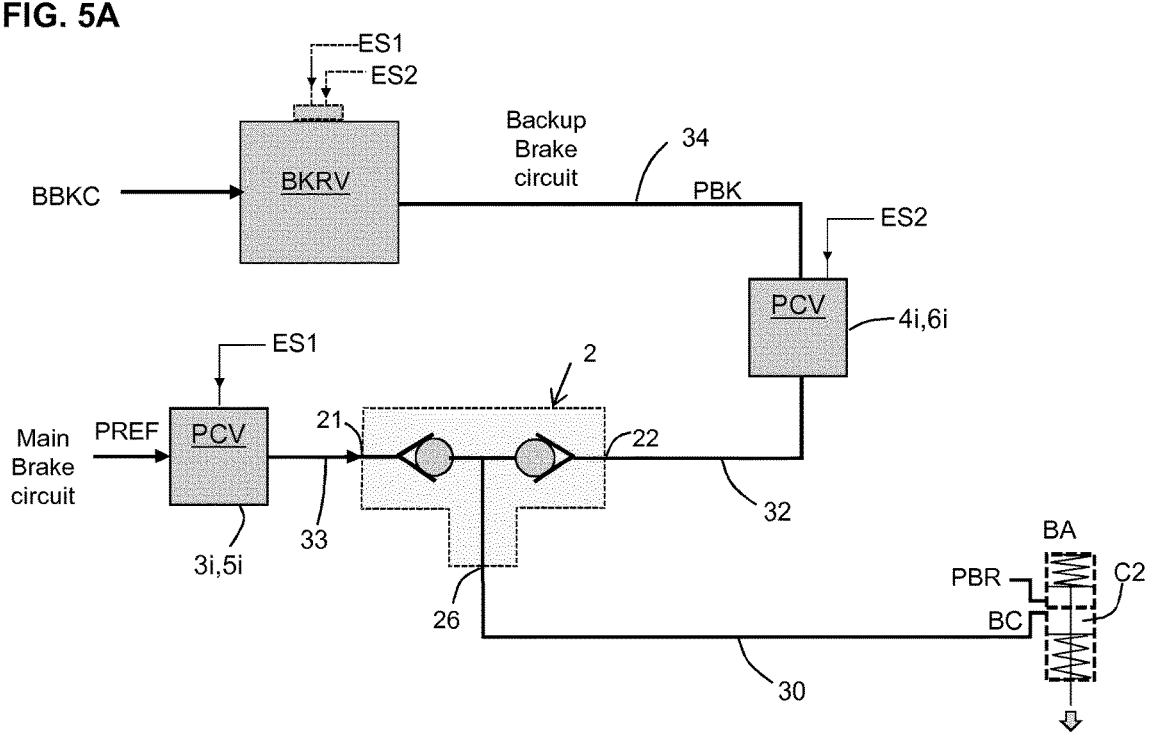
FIG. 5A shows a more detailed view of a local braking arrangement.

As shown in more detail on FIG. 5A, each double check valve (referred to generically by reference 2) has an outlet 26 coupled to the service brake chamber C2 of the brake actuator BA, a first inlet 21 coupled to the main braking pneumatic circuit MBC, a second inlet 22 coupled to the backup braking pneumatic circuit BKC.

We notice that the only common portion between the main braking pneumatic circuit MBC and the backup braking pneumatic circuit BKC is the 'last' pipe 30 leading to the chamber C2 of the brake actuator BA.

A first PCV ($3i,5i$) is arranged on the main braking circuit MBC upstream the double check valve 2 (i denotes L or R respectively). A second PCV ($4i,6i$) is arranged on the backup braking circuit BKC upstream the double check valve 2. The first PCV is controlled by electrical signal(s) ES1 delivered from the first vehicle motion electronic control unit; the second PCV is controlled by electrical signal(s) ES2 delivered from the second vehicle motion electronic control unit.

Each of the front and rear axle brake modules (FBM, RBM) is an electro-pneumatic device, known per se, providing a pneumatic relay function, and pertaining to the main brake circuit MBC. In short, it selectively takes air from the compressed air supply and selectively releases air to the atmosphere while following faithfully the control signals (electrical and/or pneumatic); its output is connected to the chamber C2 of the corresponding brake actuator BA, via a pressure control valve and a double check valve as explained above.

Each of the front and rear backup relay valve BKRV-F, BKRV-F is a pneumatic relay valve, known per se, either electro-pneumatic or purely pneumatic. Its output is connected to the chamber C2 of the corresponding brake actuator BA, as backup supply, via a pressure control valve and a double check valve as explained above.

Figure 4:
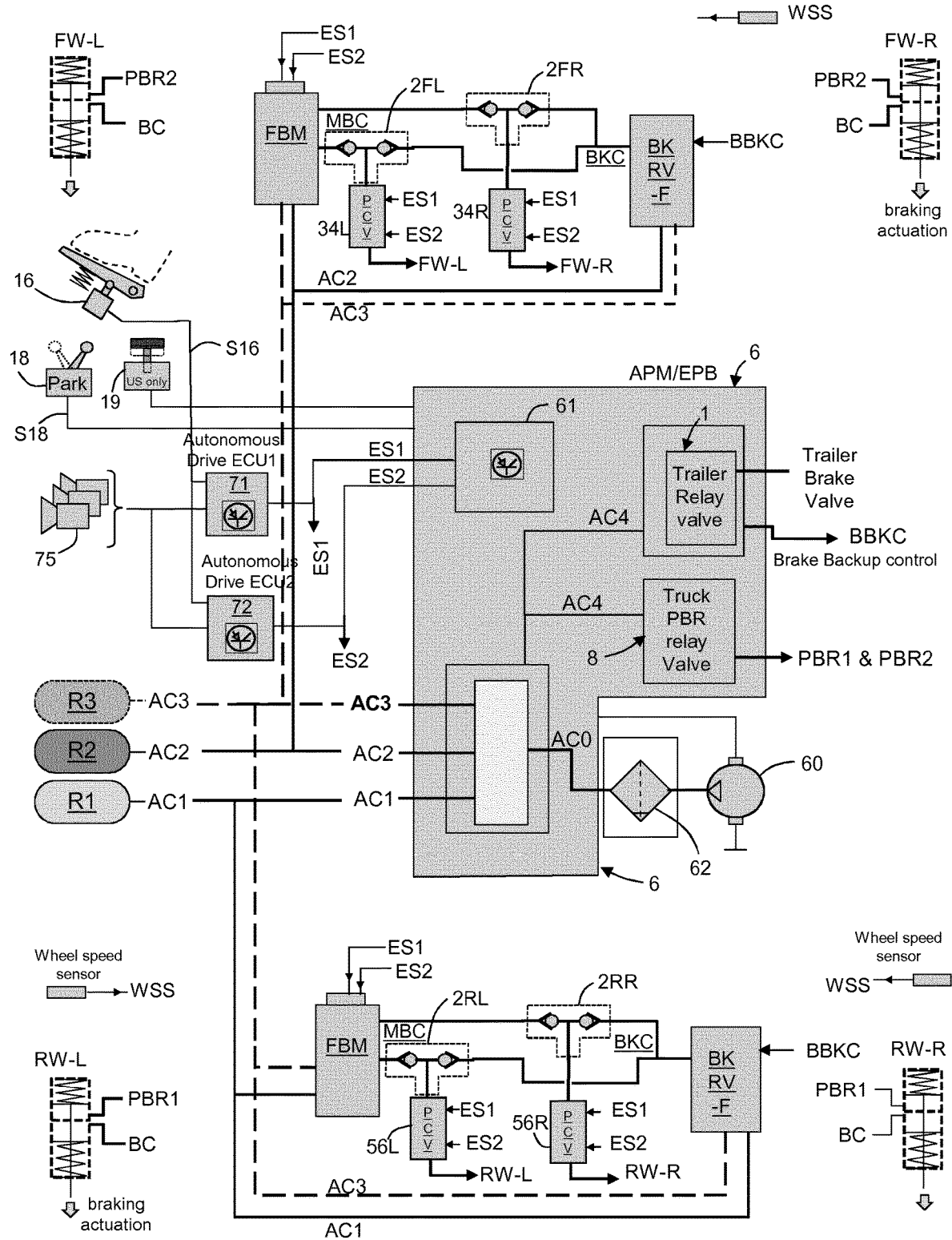
FIG. 4 is similar to FIG. 3 and shows a variant embodiment.

As shown at FIGS. 3 and 4, there are provided a first air supply circuit AC1 and a second air supply circuit AC2. Further there is provided, in the first illustrated embodiment, a third air supply circuit AC3, forming a redundant air supply to the wheel brake control devices.

There is provided a first air reservoir R1 coupled to the first air supply circuit AC1. There is provided a second air reservoir R2 coupled to the second air supply circuit AC2.

There may be provided a third air reservoir R3 coupled to the third air supply circuit AC3.

Said otherwise, there are provided three air reservoirs (R1,R2,R3 also called 'vessels'), respectively connected to first, second and third air supply circuits (AC1,AC2,AC3), which are designed to be independent from one another. First and second air supply circuits AC1,AC2, have usually a service pressure set around 12 bars. In practice, first and second air supply circuits AC1,AC2, may have a service pressure comprised in the range [5 bars-15 bars], preferably comprised in the range [7 bars-12 bars]. Third, redundant air supply circuit AC3 may have the same service pressure set around 12 bars.

The first air supply circuit AC1 provides air under pressure to the rear axle brake module RBM. The second air supply circuit AC2 provides air under pressure to the front axle brake module FBM. AC1 is sometimes called 'primary' circuit, AC2 is sometimes called 'secondary' circuit, since rear brakes are usually more powerful than front brakes.

There is provided an air compressor 60, for compressing air taken from the environment; the output of the compressor goes through a filter/dryer 62; These components are known per se thus not described in detail here.

There is provided an air production module 6 ('APM' in short), preferably housing components inside a protective enclosure, thereby providing protection against mechanical and fluid attacks. The air production module 6 is located behind the cabin, accessible from one side of the truck for carrier type truck, or accessible from top side if/when the cabin is tilted or rocked. The air production module 6 may comprise various valves, solenoids, relay valves, pressure sensor and a control unit 61.

The air production module 6 houses the core of the parking brake function and comprises the truck PBR relay valve 8. As known per se, there is provided a parking brake electric input device 18 outputting an electric signal S18, which is delivered to the control unit 61 of the APM 6. There may be provided, with regard to the USA standard, an additional braking handle 19 ('red knob') in relation with the trailer brake control. A corresponding electric signal S19 is delivered to the control unit 61 of the APM 6.

For the air under pressure, coming from the compressor and filter, there is provided a trunk portion AC0. The trunk portion AC0 distributes air through overflow valves (not shown) to the first and second air supply circuits AC1, AC2, and to the third air supply circuit AC3. Additionally, the trunk portion AC0 distributes air through an overflow valve to another air supply circuit denoted AC4 for supplying the truck PBR relay valve 8 and a trailer relay valve 1.

In the illustrated example, there are provided two autonomous drive ECUs 71,72.

Refs 71,72 are referring respectively to VMM1, VMM2, but has already hinted at the reverse is also possible.

According to one example, electrical control signals delivered by first autonomous drive control unit 71 are denoted ES1, electrical control signals delivered by second autonomous drive control unit 72 are denoted ES2, formed as conventional electrical control signals or formed as equivalent databus messages.

The brake system comprises a service brake electric input device 16 (formed generally as a brake foot pedal) delivering a first input electric signal S16. The brake system comprises two (or more) electronic brake control units 71,72 adapted to process the first input electric signal S16, and to deliver the electrical control signals (ES1,ES2) to the front and rear axle brake control units. First and second autonomous drive control units 71,72, rely at least on cameras 75 which provides a flow of images S75 which are analyzed in autonomous drive control units 71,72. There may be provided other type of sensors like radars, lidars, or the like inertial sensors 76, and also communication data received from various traffic aware entities (from fixed or mobile entities).

Components involved in the main brake circuit MBC are controlled mainly by signals ES1 from by the first autonomous drive control unit 71.

The first PCV 3R,3L,5L,5R are controlled by electrical signals ES1 delivered from the first autonomous drive control unit 71, whereas the second PCV 4R,4L,6L,6R are controlled by electrical signals ES2 delivered from the second autonomous drive control unit 72.

Components involved in the backup brake circuit BKC are controlled mainly by signals ES2 from by the second autonomous drive control unit 72.

First and second autonomous drive ECUs 71,72 form together a redundant assembly to control the braking function. However, the redundancy is obtained not only at the control units level but also at the intermediate control devices down to the brake actuators.

We note that first and second autonomous drive ECUs 71,72 are supplied by independent electrical power supplies, respectively PS1,PS2.

It is also noted that there is provided redundancy for compressed air supply.

Therefore, two fully independent braking channels are provided, resulting in high rating redundancy.

Figure 5B:
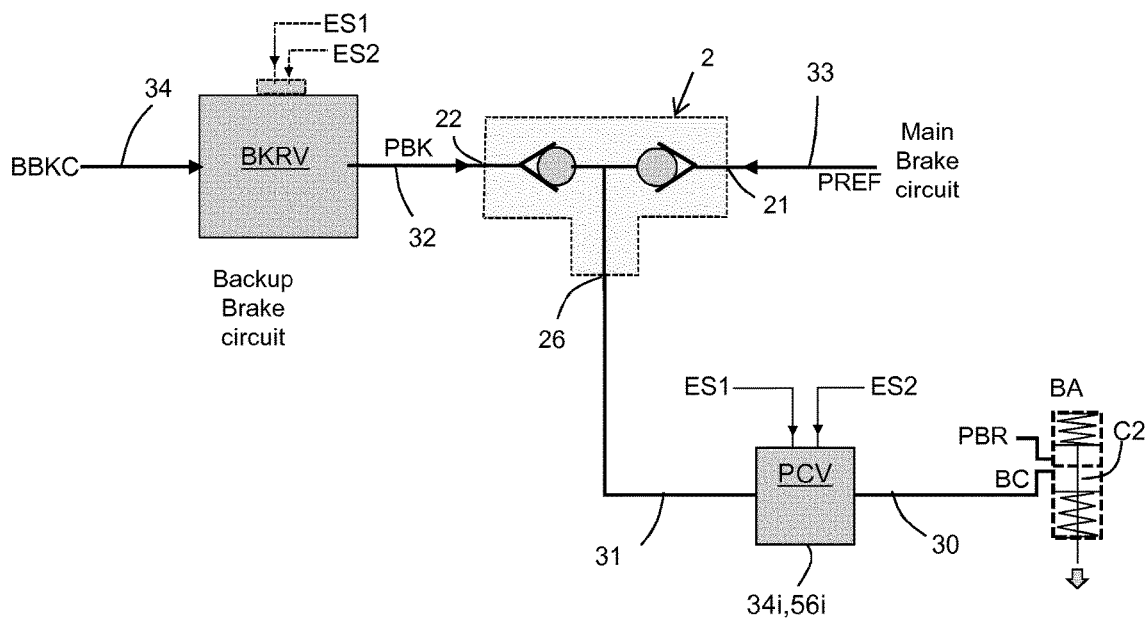
FIG. 5B is similar to FIG. 5A and shows a variant embodiment.

FIGS. 4 and 5B show a variant embodiment with a different arrangement for the double check valves (2FL, 2FR,2RL,2RR) and pressure control valves.

The pressure control valve is arranged downstream the double check valves on the to common portion pertaining both to the main brake circuit MBC and to the backup braking pneumatic circuit BKC. Stated otherwise, there is only one pressure control valve for each braked wheel. In the illustrated example, the pressure control valve 34L is dedicated to the front left wheel, the pressure control valve 34R is dedicated to the front right wheel, the pressure control valve 56L is dedicated to the rear left wheel, and the pressure control valve 56R is dedicated to the rear right wheel.

In this case, each pressure control valve 34i,56i (i denotes L or R respectively) is controlled in a dual mode by signals ES1 and ES2 coming from both first and second vehicle motion management controllers VMM1,VMM2.

For each double check valve, one input 21 is supplied from the main brake circuit MBC (conduit 33), and the other input 22 is supplied by the backup brake circuit BKC (conduit 32). The output supplies the corresponding pressure control valve PCV (via conduit 31) and the output the corresponding pressure control valve PCV is coupled via conduit 30 to the chamber C2 of the corresponding brake actuator BA.

In the illustrated example at FIGS. 3 and 4, the backup relay valves BKRV-F, BKRV-R are purely pneumatic, they are controlled by a backup pneumatic line BBKC, controlled and outputted by the air production module 6. BBKC is a proportional control line.

Additionally, there may be provided pressure sensors (not shown in the figures) that measures pressure in the various portions 30,31,32,33,34 of each pneumatic circuit.

Hot Switchover/VMM2 Taking Over from VMM1

The system, thanks to the control arrangement promoted above, advantageously comprises a hot swap functionality which is now described.

According to this feature, and upon predetermined conditions, the second vehicle motion management controller VMM2 is configured to quickly take over control of the brake actuators from the first vehicle motion management controller VMM1. In practice, as illustrated in FIGS. 6 and 6B, this transition is performed while the vehicle is riding, including particularly when the vehicle is braking.

There may be riding conditions for which this hot takeover transition is not necessary. For example, if the vehicle speed is less than 40 km/h, or if the braking demand is null or below a low threshold, the hot takeover transition may not be necessary.

Before T1, the first vehicle motion management controller VMM1 is controlling the brake actuators with a current nominal expected braking performance, VMM1 has 'online' control of braking, and has a braking setpoint defined by a braking pneumatic pressure PREF.

Figure 6A:
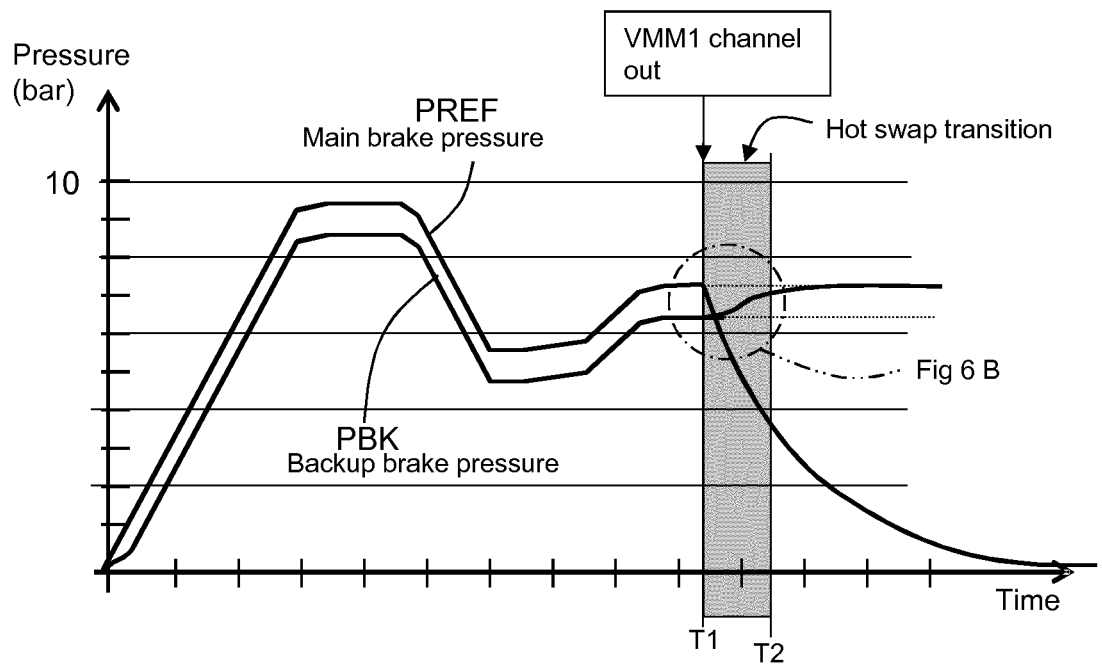
FIG. 6A illustrates a time chart illustrating hot swap from a first vehicle motion management controller to a second one.
Figure 6B:
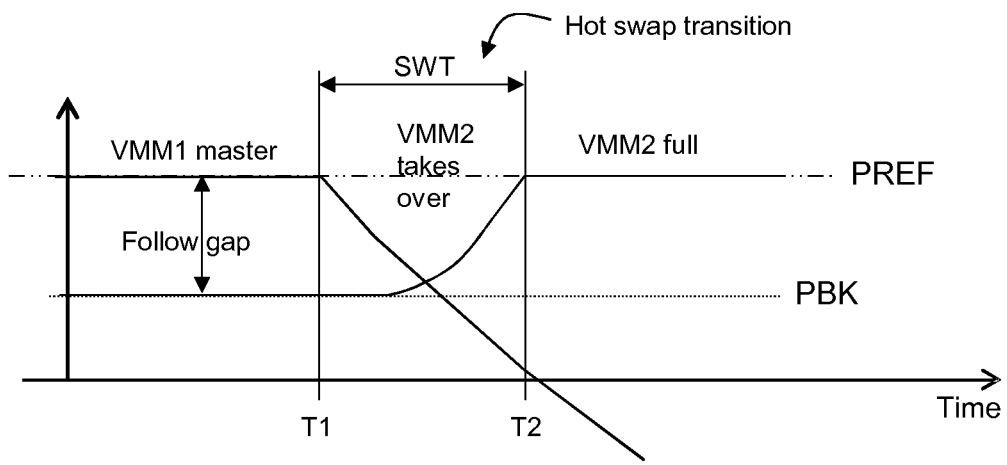
FIG. 6B shows a more detailed view of the time chart of FIG. 6A.

In practice, as illustrated in the first part of the timing chart of FIGS. 6A-6B, PREF evolves over time, we may note PREF(t) and call this the "reference" pressure. During the same time, the second, backup channel controlled by the second vehicle motion management controller VMM2, is also performing control, but with a pressure that is a bit lower than PREF(t). Said otherwise, the backup pressure denoted PBK is following the controlled reference pressure (PREF(t)), while keeping a gap such that this backup pressure has no substantial influence on the braking performance. Here we note that the double check valves (2FL, 2FR,2RL,2RR) act as 'select high' connectors, and therefore since the backup pressure PBK is lower than the reference pressure, the brake chambers C2 are controlled only by the reference pressure PREF.

In the context of the present invention, the backup pneumatic circuit is in is pre-charged mode. Generically, it is a mode called "waiting-to-operate" mode, which is different from an idle mode.

We assume here that one problem occurs before instant T1, which leads to the decision to engage a hot takeover transition.

The problem can be either a problem affecting the first controller VMM1 itself or its power supply, or a substantial problem affecting the brake actuators controlled by VMM1, or either a problem affecting a sensor essential to carry out proper control. It may happen that VMM1 is aware of a substantial problem and decides to give the leadership to VMM2. VMM1 may decide that according to the feedback namely status and capabilities received from its associated actuators, the first braking channel is not able to provide any longer currently the nominal expected braking performance.

VMM1 may decide to give the leadership to VMM2 generally in case of non nominal condition or assumed insufficient braking performance.

On the other hand, it may happen the VMM2 takes over on its own after determining that VMM1 is mute (dead or not supplied any longer). For this purpose, there is provided a cross communication link 28 between first and second vehicle motion management controllers VMM1,VMM2 (preferably a direct link). Thereby, the first and second vehicle motion management controllers can monitor each other, through mutual exchanges of 'alive & healthy' signals; and therefore a failure can be detected whenever one controller becomes mute.

Advantageously according to the present provisions, the hot takeover transition requires only a short time to be carried out. As illustrated in FIGS. 6 and 6B, the swap time SWT (SWT=T2–T1) is less than one second. Very often, it was found that the swap time SWT is less than 0.5 second. The inventors have managed to master the hot takeover transition swap time SWT as small as 0.3 second, even 0.2 second.

T2 is the instant when backup braking pneumatic circuit BKC applies the target expected pressure PREF instead of the main braking pneumatic circuit. A small loss of braking performance only occurs between T1 and T2.

The follow gap between PREF and PBK can be small, for example it can be 1 bar. It can also be a percentage of PREF.

According to one example, the control arrangement and the system logic can be designed as to comply with the equation: 0.5 PREF<PBK<0.99 PREF.

According to another example, the control arrangement and the system logic can be designed as to comply with the equation: 0.85 PREF<PBK<0.95 PREF.

Is such a narrow gap, the time required to increase the pressure from PBK to PREF is substantially decreased, and this it is possible to achieve very short time for the hot takeover transition.

In the waiting-to-operate mode, the second vehicle motion management controller VMM2 receives, in a real-time fashion, current setpoints (PREF or the like) from the first vehicle motion management controller VMM1. VMM2 can calculate them from PBK (PBK(t) since it evolves over time).

The second vehicle motion management controller VMM2 may calculate on its own, in a real-time fashion, current setpoints from the first vehicle motion management controller VMM1 setpoints received from the first vehicle motion management controller VMM1.

Alternatively, the first vehicle motion management controller VMM1 can compute the 'backup setpoints and send them to the second vehicle motion management controller VMM2.

Figure 9:
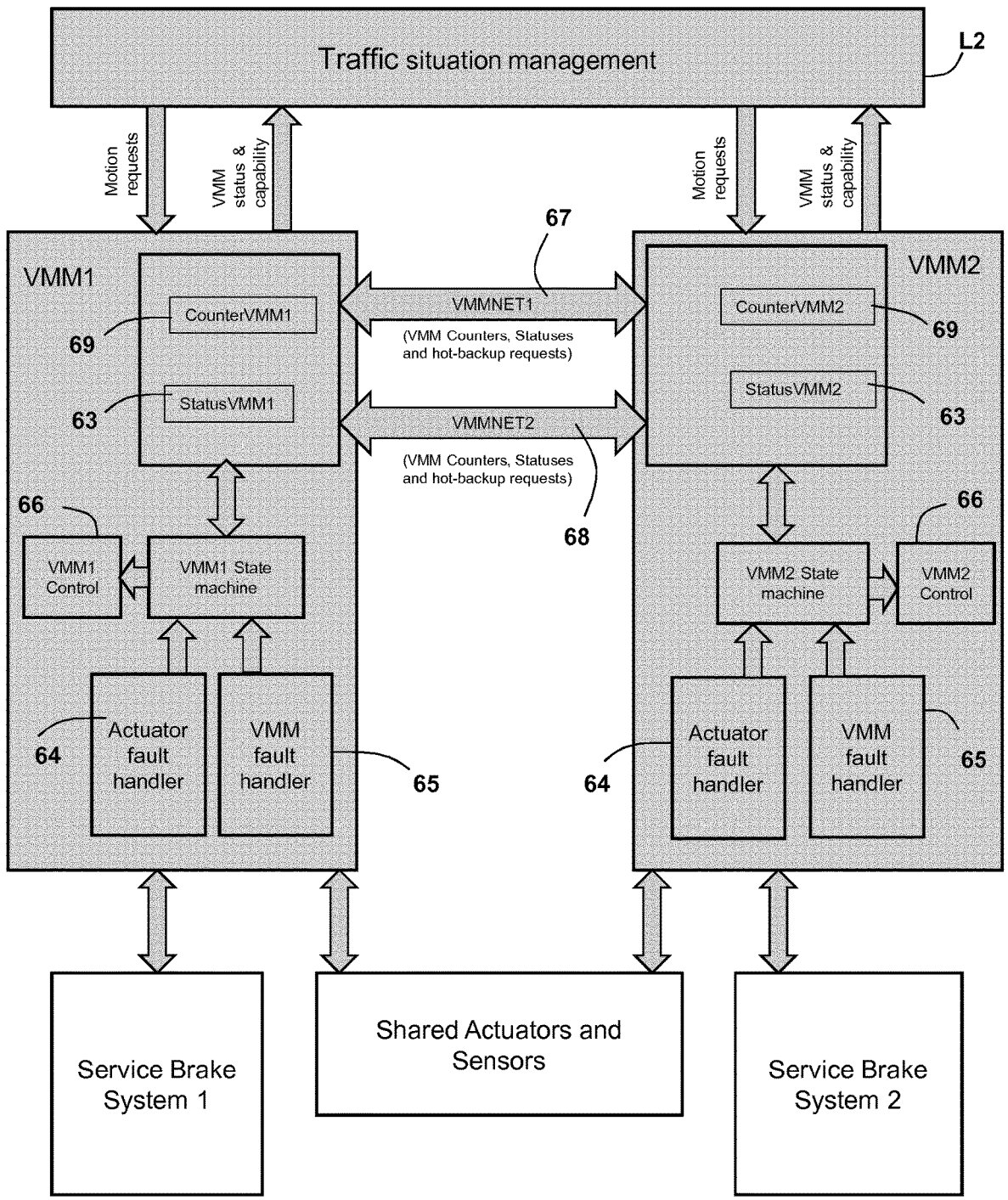
FIG. 9 illustrates a functional block diagram of the vehicle motion management controllers.

As illustrated at FIG. 9, each of first and second vehicle motion management controllers VMM1, VMM2 exhibit a fault handler 64 for the monitored actuators and a fault handler 65 to monitor proper operation of the VMM resources and microcontroller itself (this monitoring should be done with a watchdog circuit, preferably independent from the microcontroller core). A fault handler for the monitored actuators can concern dedicated actuators or shared actuators. Also the sensors are monitored, through plausibility tests and consistency checks with other sensors.

Regarding the actuator Fault Handler 64: in this fault handler, the status and capability information received from each of the actuators is monitored. Any 'lost communication' with the actuators is also monitored here. The actuator fault handler then summarizes this information and decides if any detected faults are critical.

Regarding the core VMM Fault Handler 65: This fault handler is intended to detect faults in the actual 'VMM control' algorithm itself. It is intended to check two things; firstly it compares the inputs of the VMM control block (from the traffic situation management layer) to the actuator requests generated from the VMM control block 66, and checks that these are plausible/consistent (i.e. the generated request signals within some specified ranges etc); secondly it checks that the measured motion of the vehicle (signals S76 from the inertial sensors 76) is as expected, given the requests that were sent from the traffic situation management. If a significant deviation is detected from what is expected then this is reported as a fault in VMM.

The data from the fault handlers is summarized in the health signals 67,68 which are communicated from VMM1 to VMM2.

In addition to the fault handlers listed above, VMM1 may also monitor its own power supply PS1 as well as the sensors connected to it (e.g. check sensor signals are within range), the status of the monitors is also reflected in the general VMM1 health status 63.

In addition to a health status, VMM1 will also communicate a free running counter signal 69 to VMM2.

VMM2 has its own actuator fault handler 64 and its own VMM fault handler 65 which are used to detect faults in its own actuators and its own VMM controller. The major components of VMM2 work and behave like those of VMM1 as explained above.

During the startup process VMM1 will only go into 'active' if VMM2 is reporting that it has no detected faults.

VMM2 will 'switch' into active mode when any of the following occurs:
  VMM1's health status become 'unhealthy/critical fault detected'
  The counter received from VMM1 becomes frozen
  Loss of communication between VMM1 and VMM2
Once VMM1 has gone into an unhealthy state (and VMM2 has become active) a switch back to VMM1 can only occur once the vehicle has been stopped and an initial startup process has been carried out again with the vehicle stationary.

According to another embodiment of the monitoring process, in addition to what is described above, there may be provided, a complete cross checking between VMM1 and VMM2. More precisely, VMM2 additionally performs monitoring of VMM1's inputs and outputs besides its own inputs/outputs, and vice versa VMM1 additionally performs monitoring of VMM2's inputs and outputs, besides its own inputs/outputs.

As illustrated at FIG. 10, each wheel brake control unit WBCU comprises redundant circuits, both for electrical and pneumatic circuits. Channel A is controlled by VMM1, whereas Channel B is controlled by VMM2. In use configuration, it is preferably a full dual parallel configuration.

Miscellaneous

The principle of operation and arrangement set forth above is also applicable to the electromechanical brakes type.

The principle of operation and arrangement set forth above is also applicable to the hydraulic brakes type.

Regarding the park brake function, it can be regarded generally as a third braking channel, that can be used in case of emergency when the main and backup circuits exhibit a severe failure that prevent proper backup operation.

In an alternative option, the park brake function could be used for the backup braking pneumatic circuit with few additional components to make available the backup braking pneumatic circuit, forming thereby a cost effective solution.

In this case the pre-charge is a pressure lower than the normal parking brake pressure PBref under normal driving conditions. This is particularly relevant when parking brake function is also featuring anti-locking function by itself. However, it is to be noted that the pressure logic here is inverse; a pressure of 8 to 9 bars is applied to release parking brake in chamber C1 of brake actuator BA, and conversely pressure should be decreased to apply a brake force. Therefore, instead of a pre-charge, the pressure applied to the parking brake in chamber C1 is de-charged to a threshold in the range [5-6 bars]. Therefore, a further decrease in this pressure generated promptly a braking actuation.

The invention claimed is:

1. A control arrangement for a vehicle motion system including a braking function comprising:
   motion actuators with at least one or more brake actuators pertaining to the braking function, wherein the at least one or more brake actuators operate with compressed air; and
   at least a first vehicle motion management controller and a second vehicle motion management controller, forming a redundant assembly to control the braking function;
   wherein there is provided a main braking pneumatic circuit controlled by the first vehicle motion management controller, and a backup braking pneumatic circuit controlled by the second vehicle motion management controller;
   wherein, in riding conditions, the first vehicle motion management controller is controlling the at least one or more brake actuators with a current braking performance defined by a braking setpoint with a braking pneumatic pressure (PREF), while the second vehicle motion management controller is in a waiting-to-operate mode, without any influence on the braking performance;
   wherein the backup braking pneumatic circuit is pre-charged in the waiting-to-operate mode, with a waiting-to-operate pressure (PBK) which is less than the pressure applied in the main braking pneumatic circuit (PREF);
   wherein the waiting-to-operate pressure (PBK) is caused to lie within a waiting-to-operate range, the waiting-to-operate range being defined by the condition: 0.85 PREF<PBK<0.95 PREF; and
   wherein the control arrangement comprises a hot swap functionality in which the second vehicle motion management controller is configured to take over control of the at least one or more brake actuators from the first vehicle motion management controller, with the same current braking performance, in a time period of less than 1.0 second.

2. The control arrangement of claim 1 wherein, in the waiting-to-operate mode, the backup pressure is caused to follow the controlled reference pressure with a follow gap.

3. The control arrangement of claim 1, further comprising one or more brake control devices at each vehicle axle or at each braked wheel, configured to delivered a controlled pressure to one or more brake associated actuator(s).

4. The control arrangement of claim 1, comprising one or more local braking arrangements, each one of the one or more local braking arrangements comprising:
   a brake actuator, with a service brake chamber; and
   a double check valve comprising:
      an outlet coupled to each service brake chamber of each brake actuator;
      a first inlet coupled to the main braking pneumatic circuit; and
      a second inlet coupled to the backup braking pneumatic circuit.

5. The control arrangement of claim 4, each one of the one or more local braking arrangements further comprising a pressure control valve which performs an anti-locking function, each pressure control valve being interposed between each double check valve and each service brake chamber of each brake actuator.

6. The control arrangement of claim 4, each one of the one or more local braking arrangements further comprising a pressure control valve which performs an anti-locking function, each pressure control valve being arranged upstream of each double check valve on the backup braking pneumatic circuit.

7. The control arrangement of claim 1, further comprising a cross communication link between the first and the second vehicle motion management controllers.

8. The control arrangement of claim 7, wherein in the waiting-to-operate mode, the second vehicle motion management controller receives, in a real-time fashion, current setpoints from the first vehicle motion management controller.

9. The control arrangement of claim 2, wherein the backup braking pneumatic circuit is formed by a parking brake circuit, wherein the pre-charge is a pressure lower than a normal parking brake pressure under normal driving conditions.

10. A method to control a vehicle motion system including a braking function, the vehicle motion system comprising:
   motion actuators with at least one or more brake actuators pertaining to the braking function, wherein the at least one or more brake actuators operate with compressed air; and
   at least a first vehicle motion management controller and a second vehicle motion management controller forming a redundant assembly to control the braking function, with a main braking pneumatic circuit controlled by the first vehicle motion management controller, and a backup braking pneumatic circuit controlled by the second vehicle motion management controller;

the method comprising:
- in riding conditions, the first vehicle motion management controller controls the at least one or more brake actuators with a current braking performance, defined by a braking setpoint with a braking pneumatic pressure (PREF), supplied in the main braking pneumatic circuit controlled by the second vehicle motion management controller, while the second vehicle motion management controller is in a waiting-to-operate mode, without any influence on the braking performance;
- wherein the backup braking pneumatic circuit is pre-charged in the waiting-to-operate mode, with a waiting-to-operate pressure (PBK) which is less than the pressure (PREF) applied in the main braking pneumatic circuit;
- wherein the pressure (PBK) is caused to lie within a waiting-to-operate range, the waiting-to-operate range being defined by the condition: 0.85 PREF<PBK<0.95 PREF; and
- upon a non-nominal condition at the first vehicle motion management controller, when part or all features of the first vehicle motion management controller become unavailable, the second vehicle motion management controller is configured to take over control of the at least one or more brake actuators from the first vehicle motion management controller, with the same current braking performance, wherein the control takeover is achieved within a time period less than 1.0 second.

11. The method of claim 10, wherein:
in the waiting-to-operate mode, the second vehicle motion management controller receives, in a real-time fashion, current setpoints from the first vehicle motion management controller.

12. The method of claim 11, wherein the second vehicle motion management controller calculates on its own, in a real-time fashion, current setpoints from the first vehicle motion management controller setpoints received from the first vehicle motion management controller.

13. The method of claim 10, wherein there is provided a cross communication link between the first and the second local vehicle motion management controllers, which exchange with one another alive & healthy signals.

14. A vehicle comprising the system of claim 13.

* * * * *